Feb. 9, 1932.   H. D. MUNDAY   1,844,174
BRUSH HOLDER DEVICE FOR TRUING COMMUTATORS
Filed May 18, 1928   8 Sheets-Sheet 1
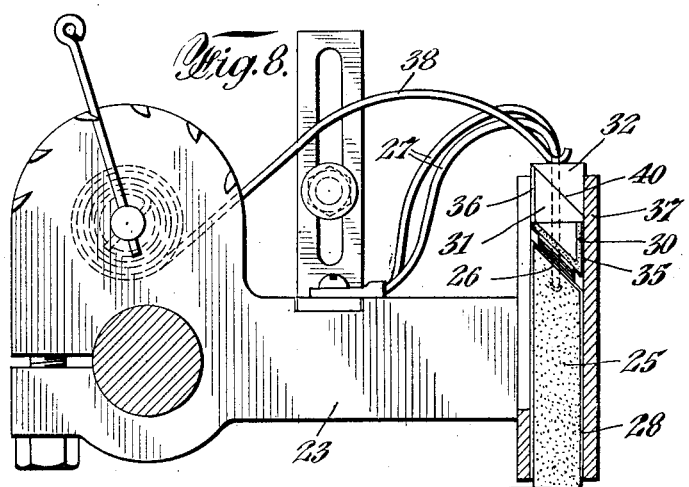
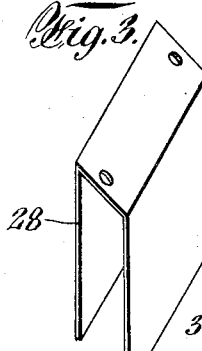
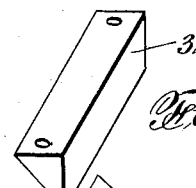
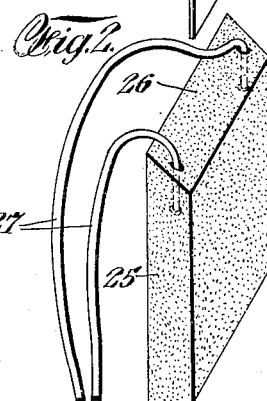
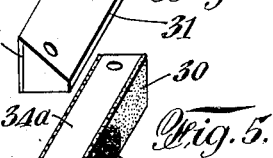
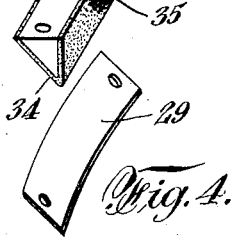
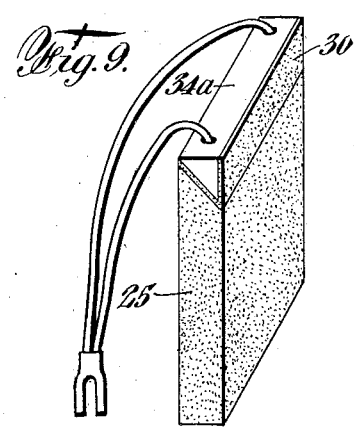
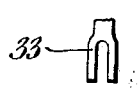
INVENTOR
Horace D. Munday
BY
Sheldon H. Graves
his ATTORNEY.

Feb. 9, 1932.  H. D. MUNDAY  1,844,174
BRUSH HOLDER DEVICE FOR TRUING COMMUTATORS
Filed May 18, 1928    8 Sheets-Sheet 2

INVENTOR
Horace D. Munday
BY
Sheldon H. Graves
his ATTORNEY.

Feb. 9, 1932. H. D. MUNDAY 1,844,174
BRUSH HOLDER DEVICE FOR TRUING COMMUTATORS
Filed May 18, 1928　　8 Sheets-Sheet 3
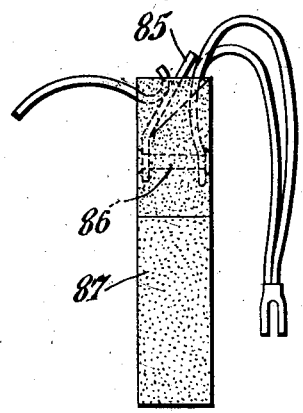
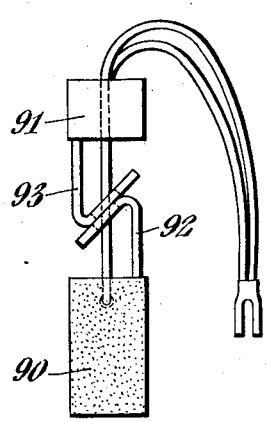
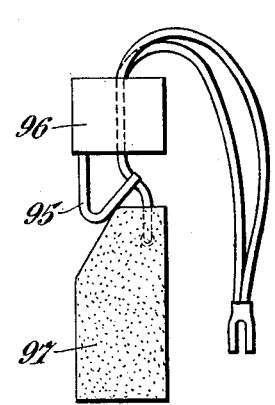
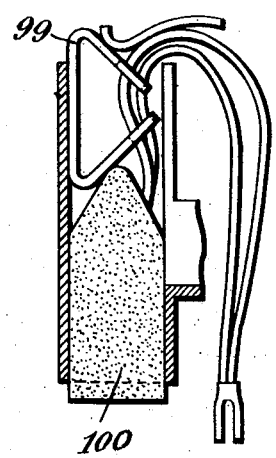
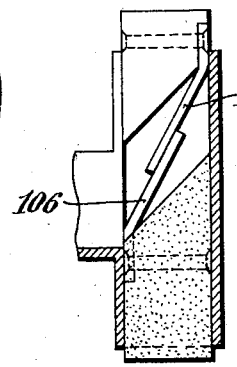
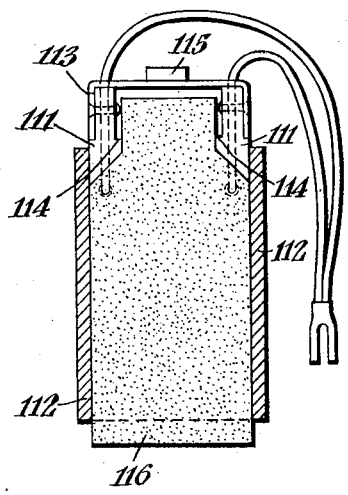
INVENTOR
Horace D. Munday
BY
Sheldon H. Graves
his ATTORNEY.

Feb. 9, 1932. H. D. MUNDAY 1,844,174
BRUSH HOLDER DEVICE FOR TRUING COMMUTATORS
Filed May 18, 1928   8 Sheets-Sheet 4
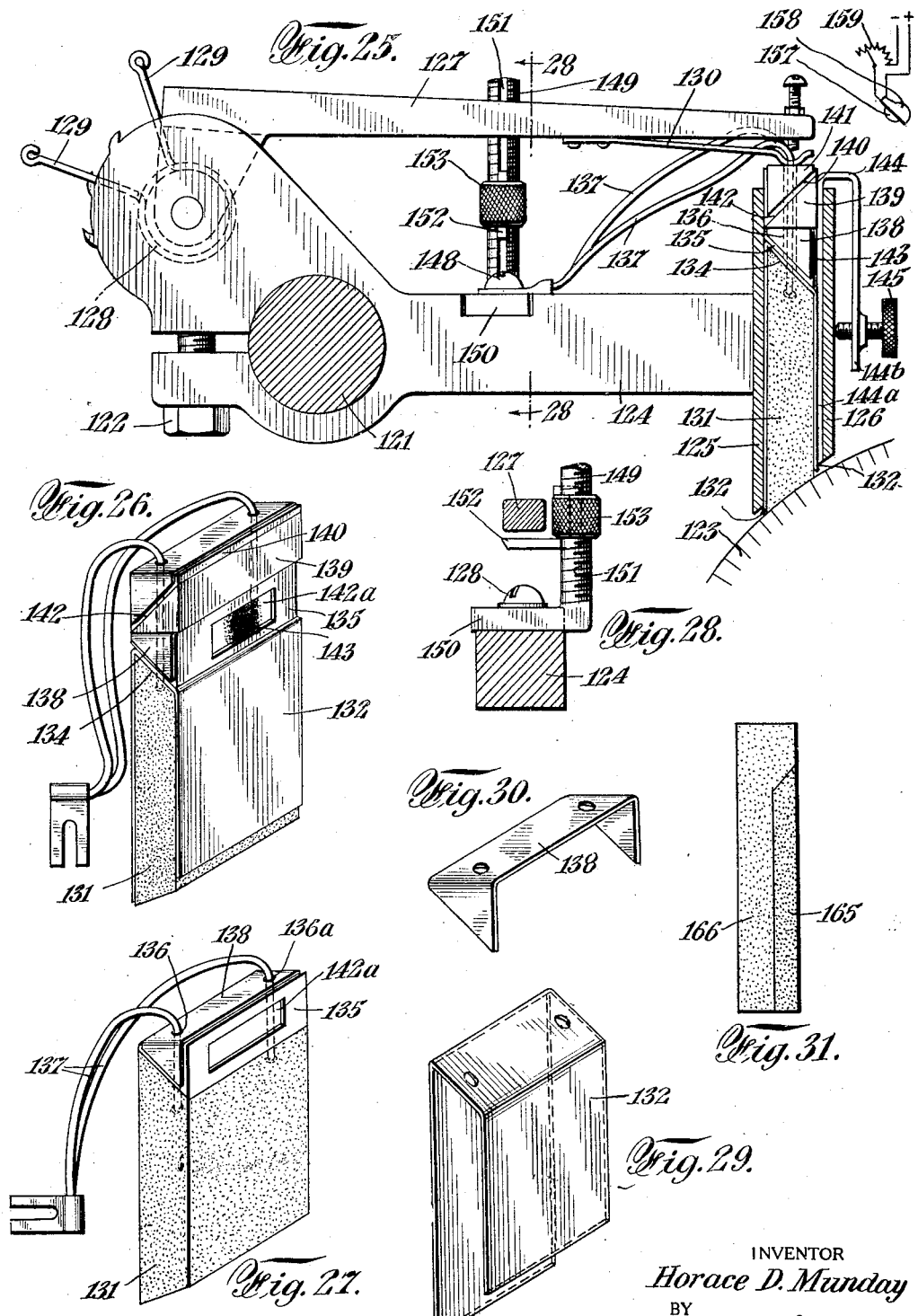
INVENTOR
Horace D. Munday
BY
Sheldon H. Graves.
his ATTORNEY.

Feb. 9, 1932. H. D. MUNDAY 1,844,174
BRUSH HOLDER DEVICE FOR TRUING COMMUTATORS
Filed May 18, 1928 8 Sheets-Sheet 5
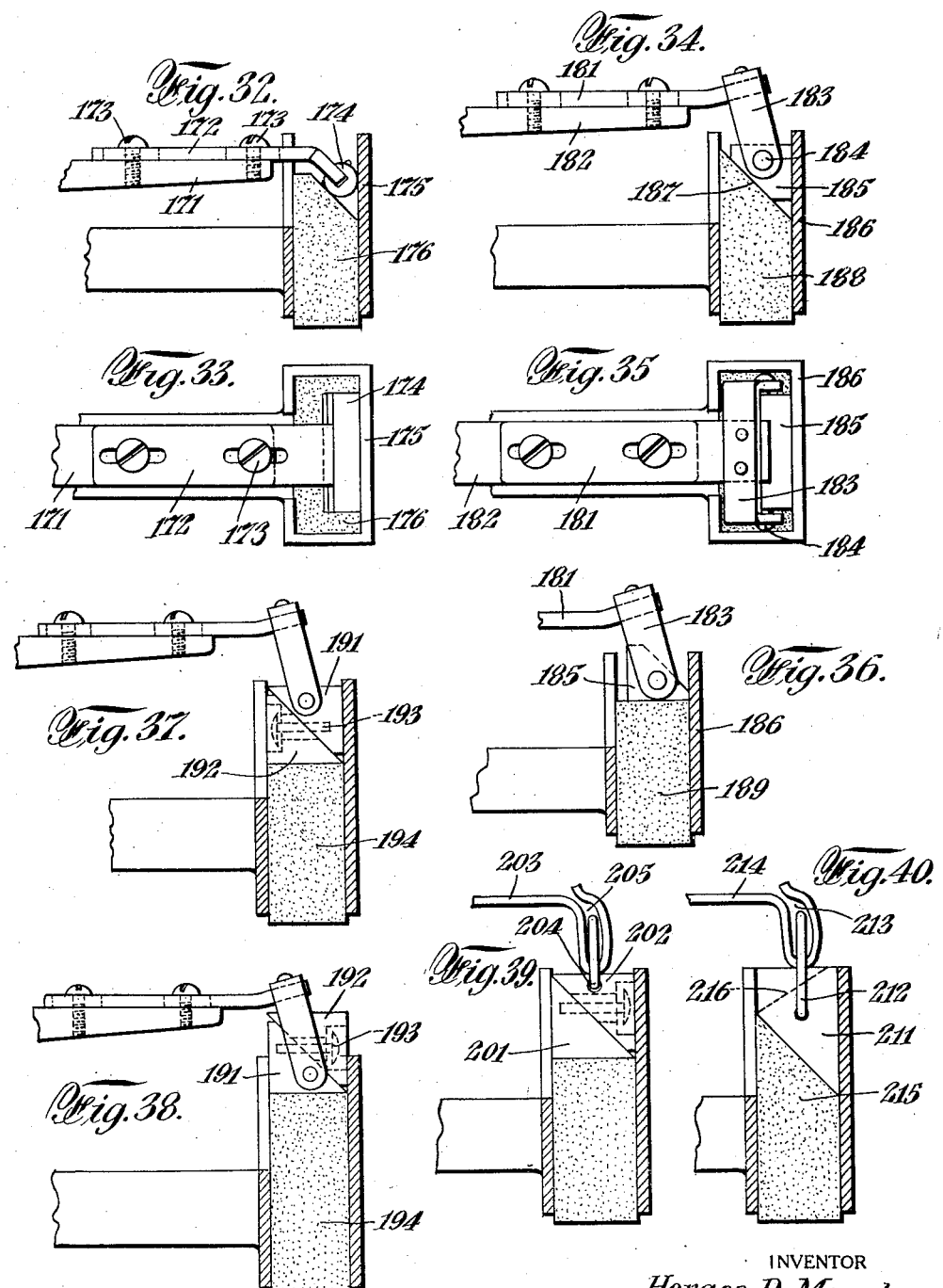
INVENTOR
Horace D. Munday
BY
Sheldon H. Graves
his ATTORNEY Feb. 9, 1932.    H. D. MUNDAY    1,844,174
BRUSH HOLDER DEVICE FOR TRUING COMMUTATORS
Filed May 18, 1928    8 Sheets-Sheet 6
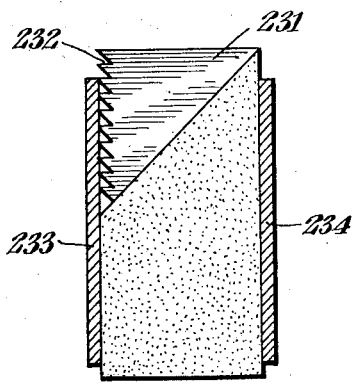
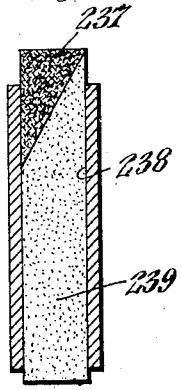
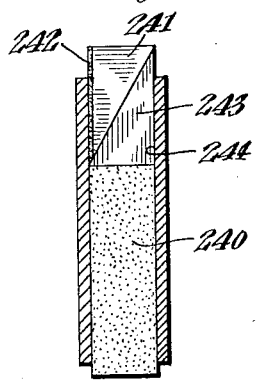
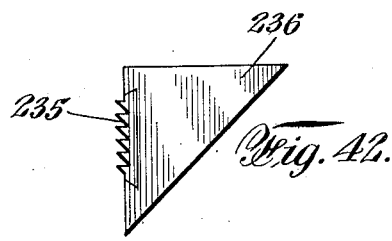
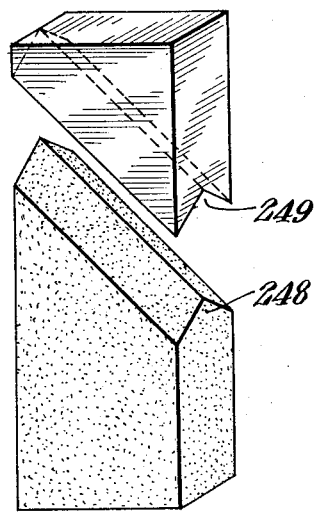
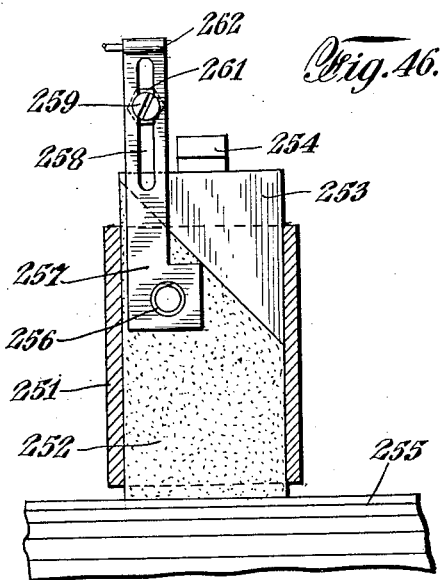
INVENTOR
Horace D. Munday
BY
Sheldon H. Graves,
his ATTORNEY.

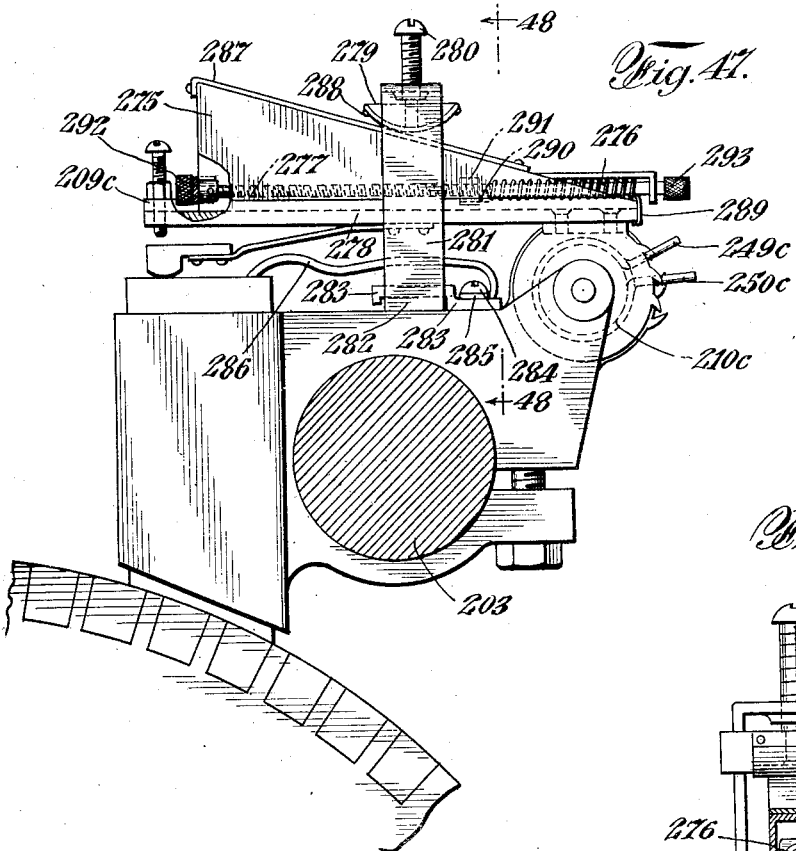
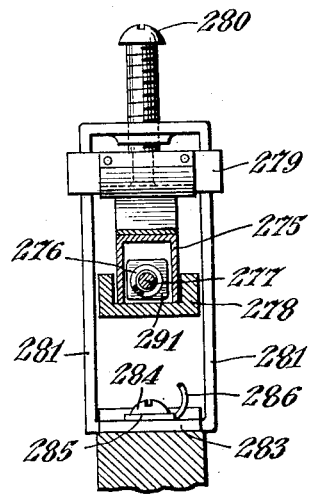
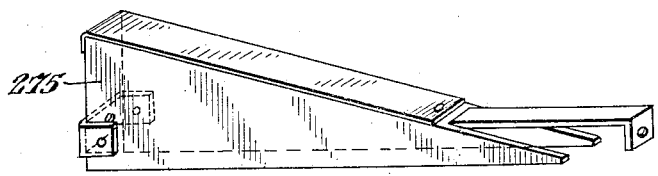

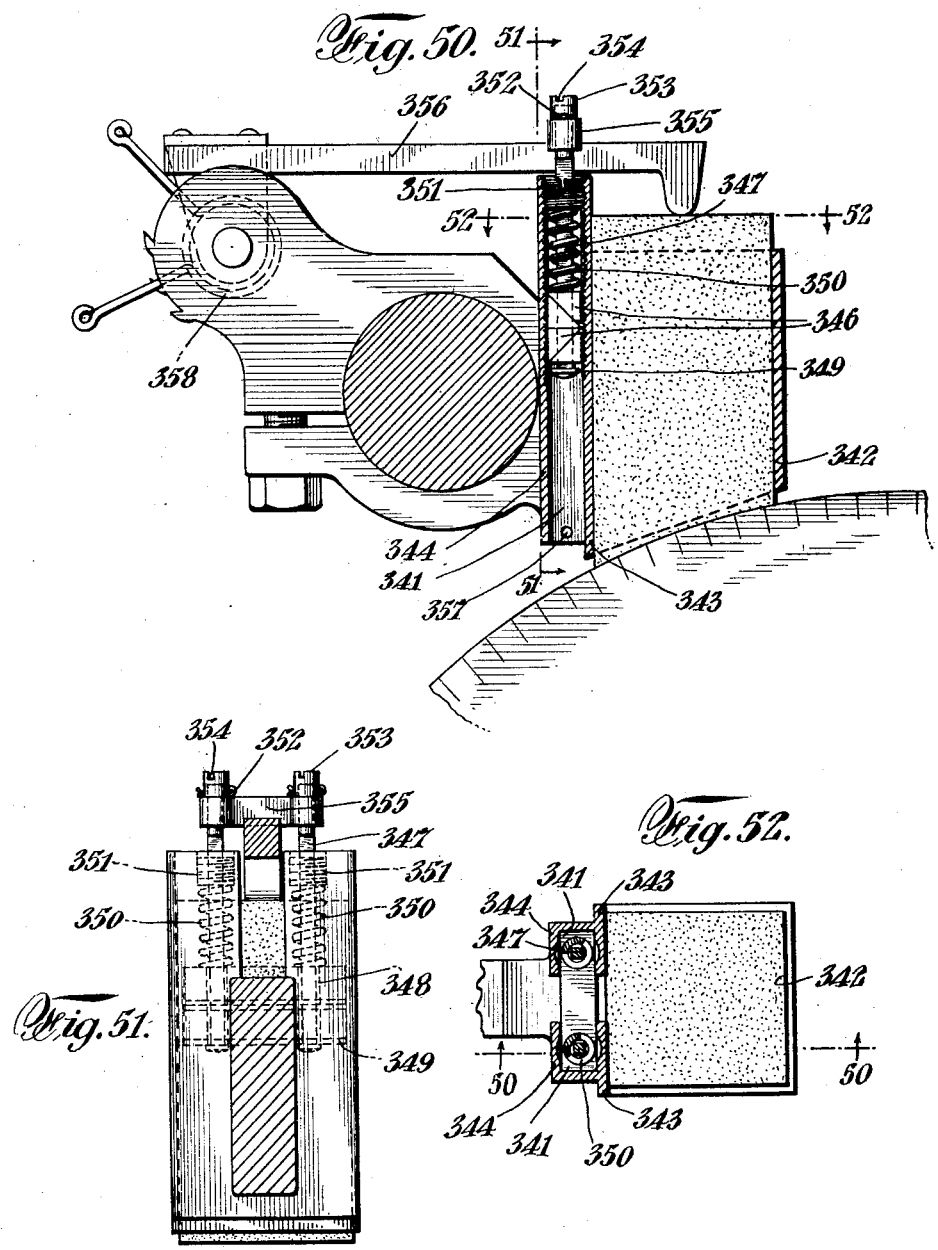

Patented Feb. 9, 1932

1,844,174

UNITED STATES PATENT OFFICE

HORACE D. MUNDAY, OF SCHENECTADY, NEW YORK

BRUSH HOLDER DEVICE FOR TRUING COMMUTATORS

Application filed May 18, 1928. Serial No. 278,751.

This invention relates to current collectors and particularly to brush holders adapted for use with commutators or slip rings.

One object of my invention is to provide a brush holder adapted for use with an abrasive member or with an abrasive brush, wherein the parts are so arranged as to cause the member or brush to exert a truing effect on the commutator of the machine with which it is used.

A further object of the invention is to provide an improved brush holder adapted for use with an abrasive member or an abrasive brush and which will cause the member or brush to exert a truing effect on the commutator of the machine with which it is used. A further object of my invention is to provide a brush holder with means for advancing or feeding the brush toward the commutator and preventing or resisting any backward motion of the brush. A further object of the invention is to provide a brush holder adapted for use on a machine which is subject to heavy vibration and wherein the wear on the moving parts of the brush holder is reduced to a minimum. A further object of my invention is to lessen the rebound of brushes on high speed electric machines, which rebound is apt to occur when slight irregularities exist in the commutator surface.

Sooner or later, from one cause or another, flat spots develop in many commutators and slip rings. An abrasive cloth and abrasive stones applied by hand are the expedients that are generally tried first to keep the machines in proper working condition. This treatment is generally unsatisfactory and the commutator continues to get worse until finally the machine has to be shut down and the commutator trued by other methods. Small armatures are generally taken out of their frames and the commutator trued in a lathe. The commutators of large machines are sometimes trued in place by a portable grinding or turning device. This operation is apt to consume several days during which the machine is out of commission. Undercutting of the mica in the commutator is one remedy tried for these obvious disadvantages. On small commutators undercutting of the mica is not satisfactory because the slots formed in the commutator by the undercutting are apt to fill up with dirt and burn out the armature.

In employing the devices constructed in accordance with the present invention, I overcome the disadvantages just noted. The operation of such devices is automatic and does not require the constant attention of the operator. Furthermore it does not or need not interfere with the normal operation of the machine.

The abrasive or active member employed for truing the commutator may be a block formed of pure abrasive and adapted to be employed in a brush holder of the machine or otherwise associated with a brush holder, or the active member may contain conducting material in addition to abrasive material, and such member may function not only as the active truing element but also as one of the brushes of the machine.

In the preferred embodiments of my invention, means is provided for advancing the abrasive or active member toward the commutator and also for hindering the motion of the abrasive, that is, retarding or preventing motion of the abrasive toward or away from the commutator.

One effect of a hindering means employed by me is to prevent the abrasive from advancing quickly into a low spot of the commutator as the low spot passes under the abrasive and to confine the rubbing of the abrasive to the high spots of the commutator. Or in case the abrasive does enter the low spot of the commutator the hindering means will offer a high resistance to the backward or retrograde motion of the abrasive as the abrasive is being pushed back by the commutator surface onto the high spot. In either of these cases the abrasive will be pressed less against or toward the low spots of the commutator than against other portions of the commutator surface, with the result that ultimately the commutator will be ground to a true cylindrical surface.

The hindering means which I employ may be frictional or it may comprise a viscous or difficultly deformable substance such as asphalt.

Numerous objects and advantages of my invention, other than those above noted, will appear from the following description taken in connection with the accompanying drawings which show certain embodiments of my invention and wherein:

Figure 1 is a perspective view of a brush and parts assembled therewith:

Figure 2 to 7 are perspective views of parts shown in Figure 1;

Figure 8 is a side elevation of a brush holder with the parts shown in Figure 1 mounted therein;

Figure 9 is a perspective view of a modification;

Figures 19 to 24 show further modifications;

Figure 25 is a side elevation of a brush holder showing the preferred form of my invention;

Figure 26 is a perspective view of the abrasive member shown in Figure 25 together with its cooperating hindering means and brush box protecting means;

Figure 27 is a perspective view of the abrasive member shown in Figure 25 and part of the hindering means;

Figure 28 is a detail fragmentary view partly in section on the line 28—28 of Figure 25;

Figure 29 is a detail view of one element of the protective means shown in Figure 25;

Figure 30 is a detail perspective view of the metal cap covering the wedge that forms part of the hindering means shown in Figure 25;

Figure 31 shows a further modification;

Figure 32 is a fragmentary side elevation partly in section showing a further modification;

Figure 33 is a top plan view of the structure shown in Figure 32;

Figures 34 and 35 are views similar to Figures 32 and 33 respectively, but showing a modification;

Figure 36 is a modification of Figure 34;

Figures 37 to 45 show further modifications;

Figure 46 is a front elevation partly in section of a truing brush or abrasive mounted in a brush holder box, the latter being shown in section, together with means for limiting the advancement of the brush or member to a predetermined amount;

Figure 47 is a side elevation of a brush holder showing a further modification;

Figure 48 is an end view partly in section on the line 48—48 of Figure 47;

Figure 49 is a perspective view of the hollow wedge shown in Figures 47 and 48;

Figure 50 is a view similar to Figure 47, but showing a modification, this view being partly in section on the line 50—50 of Figure 52;

Figure 51 is an end view partly in section on the line 51—51 of Figure 50, and

Figure 52 is a fragmentary view partly in section on the line 52—52 of Figure 50.

Figure 10:
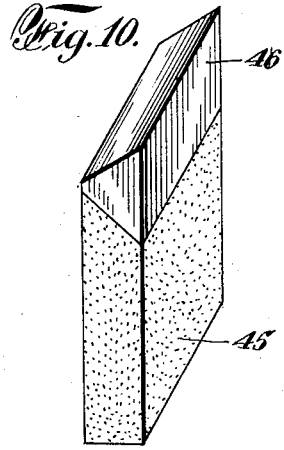
Figure 10 is a perspective view of a further modification.

A device embodying this invention is shown in Figure 1. The parts of this device before assemblage and in the order of assemblage are shown in Figures 2, 3, 4, 5, 6 and 7. In Figure 8 is shown the brush mounted in a brush holder 23 of an electric machine, in position to coact with and true up a rotating commutator 24.

The carbon brush 25 may, for example, contain 25% of abrasive powder of, say, 200 mesh. The outer end 26, as shown, is beveled at an angle of about 45°. To this end are attached the brush pigtails 27. To form a loose assemblage of the several parts, these pigtails are threaded successively from the bottom up through the holes in parts 28, 29, 30, 31 and 32. The last step in the assemblage is to connect the ends of the pigtails 27 to the terminal 33. The protective member 28 is made of a tough paper, such as leatheroid of, say, ten mills thickness.

In Figure 4 is shown a phosphor bronze spring 29. This spring is merely a piece of phosphor bronze slightly bent to act as a weak spring. This spring is considerably weaker than the brush-holder spring that advances the brush towards the commutator, so that this spring 29 is easily completely compressed or flattened out by the action of the brush-holder spring.

The next member in order of assemblage is the block or pusher member 30 with a bevel 34 of about 45°. The block 30 may be of carbon or other suitable material. Over the top and sides of this block is the metal reinforcing cap 34a. This cap 34a is soldered to the block 30 after the latter has been copper plated. The width of this block may be made slightly less than the width of the brush-holder box, so as to give room for a little bit of asphalt 35 to be smeared on the face of the block.

The next member in order of assemblage is the block or pusher member 31, which may be made of fibre or wood or metal or carbon.

On its vertical face is cemented the leather strip 36, for the purpose of increasing the friction between the block 31 and the wall of the brush-holder box 37. This block also has a bevel of about 45°.

The next member in order of assemblage is the block or pusher member 32. This block is similar to 31, except that it is inverted and the leather friction surface omitted.

The last member to be assembled is the terminal 33 joining the ends of the pigtails 27.

The purpose of the beveled faces of the several members is to jam these parts against the sides of the brush-holder box and cause friction that will hinder the movement of the brush. This friction hinders the brush-holder spring 38 in advancing the brush towards the commutator or onto a flat spot in the commutator; on the other hand the friction aids the brush-holder spring in checking a retrograde movement of the brush, as when a high spot of the commutator comes under the brush and shoves the brush backwards. Evidently the high spot of the commutator will have to exert a much greater pressure to shove the brush backwards from the commutator than the flat spot of the commutator will have to exert to merely stop the advancement of the brush towards the commutator. The wear on the commutator will be greatest where the pressure is greatest; so the high spots of the commutator will be worn away faster than the flat spots, and the commutator will finally become true. In the above explanation just given the viscous substance hindering means was not taken into consideration, the friction being assumed to act alone.

The viscous substance, such as asphalt 35, might also act alone; that is, without any help from friction, as is brought out in my Patent Number 1,727,112. Since the viscosity of the asphalt delays the advance of the brush, the flat spots of the commutator will be hurdled by the brush—either when the asphalt is applied to the brush, or the follow up spring 29 omitted when the asphalt is applied to a pusher member; so that the commutator will be trued up with a minimum copper loss. If the viscosity of the asphalt is high there is practically no relative motion of the brush in the brush-holder box when the high spot of the commutator comes under the brush and forces both the brush and brush holder backwards. If the viscosity of the asphalt is low, however, the brush may move a little in the brush holder when a high spot of the commutator comes under the brush.

It has just been said that when the viscosity of the asphalt is low the brush might move backwards a little relative to the brush holder when a high spot of the commutator came under the brush. With friction to aid the asphalt in hindering motion of the brush, a stiff resistance is offered to prevent a backward motion of the brush in the brush-holder box, even though the viscosity of the asphalt is low. Expressed in other words, the beveled friction members act as a kind of chock to hold some of the advancement of the brush permitted by the yielding of the asphalt. This throws some of the yielding back on the brush holder and its supporting structure, such as the brush holder stud and the brush-holder yoke.

It has been said that the asphalt delays the advancement of the brush, causing it to hurdle the high spots of the commutator. However, it may not be desired to hurdle the high spots of the commutator, and yet use the asphalt. For this purpose the spring 29 is provided. This spring 29 comes between the brush 25 and the block or pusher member 30 smeared with asphalt 35. The purpose of this spring is to make the brush 25 follow up into the flat spots of the commutator instead of hurling the flat spots of the commutator. This spring 29 is so weak that, when a high spot of the commutator comes under the brush 25, this member 25 moves backwards without appreciable hindrance from the spring 29, completely flattening this spring 29 against the member 30, by which the member 25 is effectively blocked. If it is desired to have the low spot of the commutator hurdled, the spring 29 is removed or otherwise put out of action.

It is evident that the beveled pusher members 30, 31 and 32 may be omitted, dependence being made on asphalt alone to hinder the movement of the brush; in this case a smear of asphalt would be applied to a face of the brush near its upper end.

It is evident that the asphalt may be omitted, dependence being made on the beveled members alone to hinder the motion of the brush. It is evident that the member 25 and only one of the beveled friction members, such as 30, will be sufficient to true up a commutator. The purpose of having a plurality of beveled members or pusher members is to have a greater disparity between the force required to force the brush backwards and the force required to merely stop the advancement of the brush. If, with only the one beveled member 30 or rather one inclination at 26 in action with the member 25, this disparity is in the ratio of 4 to 1, then this disparity will be in the ratio of 16 to 1 with all three members 30, 31 and 32 or two inclinations 26 and 40 in action with member 25.

Even all the pusher members may be omitted as well as the asphalt, dependence being made on the beveled brush end 26 only to give a truing effect. These modifications are covered by my copending application Serial Number 278,749 of even date herewith. In such modifications the pressure on the inclined end of the brush caused by the pressure finger causes the brush to exert a side thrust against the brush holder box thus providing the requisite friction to effect the truing action.

In Figure 9 is shown a perspective view of a sub-combination. This makes a very simple combination to manufacture and use and is efficient in operation. It is made up of the brush 25 and one of the beveled blocks or pusher members such as 30. The asphalt is omitted so that this form of truing brush can be as easily inserted in the brush-holder box or withdrawn from the same as in the ordinary non-truing brush in common use.

In Figure 10 is shown a perspective view of another modification. In this modification a bit of sticky substance, such as asphalt, is applied to the adjacent surfaces of the two members 45 and 46 in order to keep the two parts loosely assembled. In this use of asphalt it is not its viscosity but its adhesiveness that is made use of.

Figure 11:
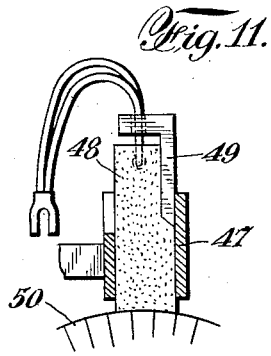
Figure 11 is a side or edge elevation, partly in section, of a brush and brush holder, showing a still further modification.

In Figure 11 is shown another modification, particularly adapted for a brush holder in which the depth of the brush-holder box 47 is not very great. By making the brush 48 considerably longer than the brush-holder box 47, the brush is sure to retain its vertical position in the brush-holder box with a consequent efficient functioning of the wedging pusher member 49 till the latter has advanced to contact with the commutator 50.

Figure 12:
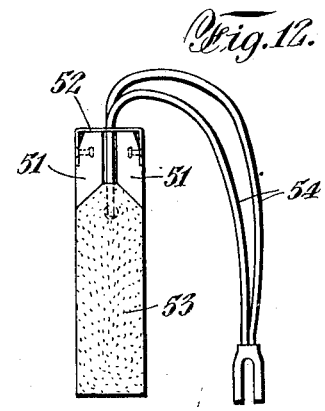
Figure 12 is an edge view of another modification.

In Figure 12 is shown another modification. In this modification there are two pusher members 51, 51 arranged in parallel. The upper ends of the members 51, 51 are connected by the thin flexible metal strip 52. The lower end of these parallel pusher members 51, 51 are beveled in opposite directions to fit over the inverted V-bevel of the upper end of the brush 53. The pigtails 54 attached to the upper end of the brush 53 pass out between the pusher members 51, 51 and through two holes in the flexible metal strip 52. The pusher members 51, 51 may be made of fibre or wood or carbon, etc. The purpose of this modification is to throw most of the friction onto the pusher members 51, 51 and avoid friction between the brush 53 and the brush-holder box, thus lessening the possibility of injury to the brush 53 or to the brush-holder box.

Figure 13:
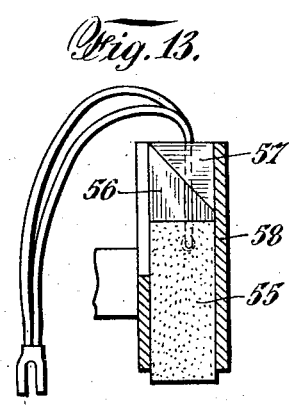
Figure 13 is a view similar to Figure 11, but showing a further modification.

In the modification shown in Figure 13 the outer end of the brush 55 is made square, a pair of wedge-shaped pusher members 56 and 57 exerting all the friction on the walls of the brush-holder box 58.

Figure 14:
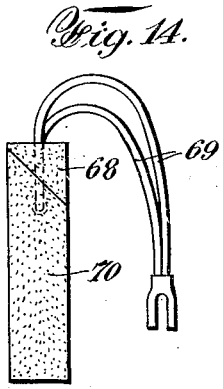
Figures 14 and 15 are views similar to Figure 12 but showing further modifications.

The modification shown in Figure 14 is substantially the same as that of Figure 9, the reinforcing metal cap 34a being, however, omitted from the pusher member 68. The pigtails 69 are secured to brush 70.

Figure 15:
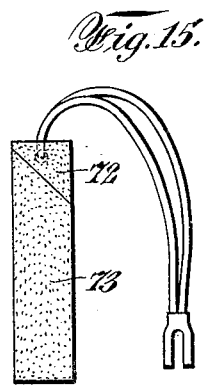

The modification shown in Figure 15 is substantially the same as that shown in Figure 14, except that the pigtails 71 are secured to the pusher member 72 instead of to the brush 73.

Figure 16:
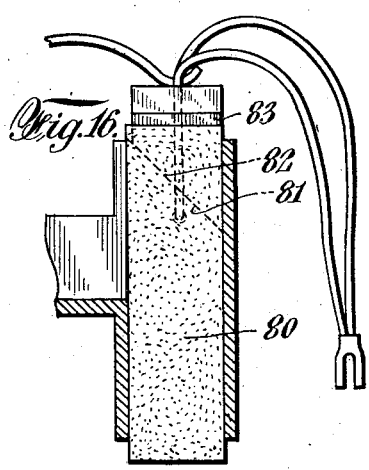
Figure 16 is a view similar to Figure 13, but showing a further modification.
Figure 18:
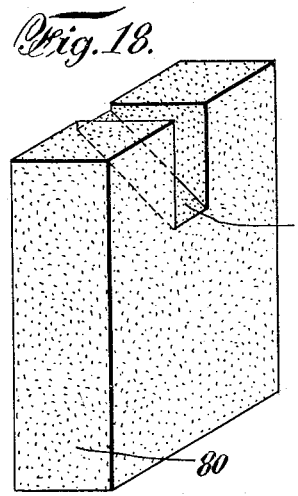
Figures 17 and 18 are detail perspective views of parts shown in Figure 16.
Figure 17:
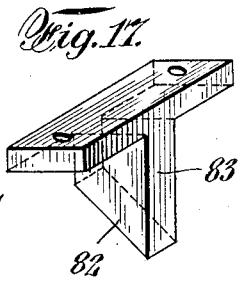

In the brush shown in Figures 16, 17 and 18 a portion only of the upper end of the brush 80 is beveled, the beveled part being 81, 82 being the complementary beveled part of the pusher member 83. In a subcombination of this modification the pusher member 83 may be omitted and the brush-holder pressure finger allowed to act directly on the beveled part 81. The reason of having a part only of the brush 80 beveled is to lessen the tendency of the brush to get out of alignment with the brush-holder box when the brush becomes quite short. By preserving the alignment of the brush the lower edges of the brush-holder box are not so likely to gouge out shoulders in the brush and make the to-and-fro movements of the brush erratic. The lower part of the brush-holder box is also less likely to be worn and enlarged if the alignment of the brush is retained till it is discarded.

The modification shown in Figure 19 differs from the brush in Figure 17 by the addition of the angular flexible metal strip 85 with its lower prong attached by the rivet 86 to the body 87. The upper prong of said metal strip 85 is disposed in the slot in the upper end of the body 87 and is capable of angular adjustment therein, the metal of the strip being thin enough to permit of bending by the fingers or by pliers.

The utility of the modification shown in Figure 19 can be seen by bearing in mind several possible conditions where a truing brush may be used. If the electric machine is a small one with only two brushes and one or both of them is being used for truing purposes, it is desirable that the truing brush shall never hurdle the flat spots of the commutator but shall make contact with the commutator just the same in the flat spots as in the other parts. To suit this case the upper prong of the metal strip 85 is bent down as far as possible, making the wedge angle comparatively large, thus decreasing the possibility that the brush will hurdle the flat spots of the commutator. Suppose, however, that the electric machine has many brushes, only a few being truing brushes. In this case it will do no harm if some of the truing brushes now and then hurdle the flat spots of the commutator. Consequently, for this condition the upper prong is bent outwards, thus making the wedge angle comparatively small and increasing the possibility that there may be sluggish action of the truing brushes with a consequent hurdling of the flat spots of the commutator. The advantage of a small wedge angle on the brush is that the commutator is trued up with less loss of copper than when the wedge angle of truing brush is larger. The angularity of the finger also has an effect on the feeding of the brush.

In the modification shown in Figure 20 both the brush body 90 and the pusher member 91 have respectively the adjustable angle strips 92 and 93. While these angle strips may be as wide as the brush body, they need be no wider than the brush-holder pressure finger; in this case the strip angle 92 may be housed in a slot in the end of the brush body, such as the slot 81 in the brush body in Figure 18. Strip angle 93 may be housed in a similar slot in the pusher member 91.

In the modification shown in Figure 21 there is only one adjustable strip angle, this being strip angle 95 attached to the pusher member 96. The adjustable strip angle 95 strikes a corner on the end of the brush body 97, but the effect is the same as if another adjustable strip angle were attached to the brush body 97. This strip angle 95 may be housed in a slot in the pusher member 96 if desired.

In the modification shown in Figure 22 a double angle strip 99 is substituted for the pusher member. This double angle strip 99 may be housed in a slot in the brush body 100 so that the main part of the brush body may extend to the top of the brush-holder box or higher if desired.

In the modification shown in Figure 23 the strip angles 105 and 106 are attached in a way slightly different from that shown in Figure 20.

In the modification shown in Figure 24 a pair of wedge pusher members 111, 111 frictionally engage the edge walls 112, 112 of the brush-holder box. The pusher members 111, 111 are flexibly connected by the U-shaped cross bar 113. On the inner sides of the pusher members are shoulders 114, 114 which serve as fulcrums to permit the wedge pusher members 111, 111 to function as levers, while at the same time functioning as wedging members. When pressure is applied by the pressure finger 115 to the flexible cross bar 113 the upper ends of the pusher members 111, 111 are forced inward, thus throwing the lower ends of the pusher members outward into stronger contact with the walls of the brush-holder box. The pusher members 111, 111 may act simply as levers to produce friction, or they may act simply as wedges to produce friction; in either case the brush will act as a truing brush. To prevent the pusher members 111, 111 serving as levers thin strips of wood may be cemented to the pusher members above the shoulders and extending to the top of the brush body 116, or the shoulders 114 cut off. Narrower strips of wood will serve to alter the position of the fulcrum, thus varying the ratio between the pressure exerted by the pressure finger and the friction of the pusher members on the walls of the brush-holder box, with the ultimate result of varying the ratio between the pressure necessary to shove the brush backwards from the commutator and the reaction pressure exerted by the commutator to stop the advancement of the brush towards the commutator.

The preferred form of the invention is shown in Figures 25 to 30.

A brush holder A is clamped to the brush-holder stud 121 by the cap-screw 122 in operative position to coact with the commutator 123. The shank of the brush holder is indicated by reference character 124, reference characters 125 and 126 indicating sides of the brush-holder box and 127 the pressure finger or brush-advancing member actuated by the spring 128 put under stress by the lever 129, 130 being an auxiliary spring attached to the pressure finger. Slidably fitting in the brush-holder box is the abrasive member 131, partly surrounded by a protecting cover or lining 132, such as leatheroid paper of, say, ten mills thickness. This lining may be pasted to the abrasive member 131. Instead of leatheroid paper pasted to the abrasive member to protect the abrasive member and the brush-holder box from usual wear as well as cause the abrasive member to slide in the brush-holder box with a more consistent friction, the sides and edges of the abrasive member may be coated with carbon or graphite. This may be done by rubbing the sides and edges of the abrasive member with a carbon or graphite brush, particularly with a lubricated brush. The outer end of the abrasive is cut at an angle of about 45°, as seen at 134. Above the abrasive member 131 is the wedging member 135, near the sides or ends of which are the holes 136 and 136a through which holes pass the pigtails 137 attached to the abrasive member 131, the holes 136 and 136a being somewhat larger, particularly at the ends, than the pigtails 137, to permit of some lateral motion of the wedging member 135 and the abrasive 131 without interference from the pigtails 137. A metal plate 138 caps the wedging member 135. Above the wedging member 135 are similar wedging members 139 and 140, the latter being capped by the metal plate 141, holes in members 139 and 140 registering with holes 136 and 136a. The use of a second inclination at 142, in addition to the first at 134, largely increases the ratio between the force required to shove the abrasive backwards from the commutator and the force required merely to stop the forward motion of the abrasive towards the commutator. This ratio may be called the pressure ratio. If the wedging members 139 and 140 are omitted the pressure finger 127 acting on wedging member 135, only one inclination, that at 134, will be in use.

The wedging member 135 is slightly less in width than the abrasive and other wedging members, and has in its face a slight depression 142a, thereby forming a space in which is deposited a bit of asphalt 143. This asphalt will adhere to the wedging member and to U-shaped protective member 144, or more particularly to the inner prong 144a of said protective member, this inner prong 144a being of a size and form to substantially cover the inner surface of the front wall of the brush-holder box, the right-hand prong 144b carrying the thumb-screw 145, which clamps 144a to the front wall of the brush-holder box.

The pigtails 137 are secured to the brush-holder shank by the screw 148.

The wear of the abrasive or the advancement of the abrasive is limited to a predetermined amount by limiting the motion of the pressure finger 127. The limiting means comprises a threaded rod 149 with its foot 150 secured to the brush-holder shank by the screw 148, the brush pigtail retaining screw. A slot 151 extends the length of the rod 149. Sliding in the slot 151 is the vertical part of the L-shaped member 152, vertically adjustable by the knurled nut 153. The horizontal part of the L-shaped member extends under the pressure finger and stops its movement at any desired point.

The pigtails 137 serve to carry current when the abrasive member has enough carbon in it to function also as a current collector. If the abrasive member is non-conducting the pigtails are still of use in keeping the parts assembled and in drawing the abrasive member out of the brush-holder box when the said abrasive member has been worn comparatively short.

In the operation of this truing device the brush is first removed from the brush holder and the U-shaped protective member 144 attached by the thumb-screw 145. The abrasive member and the hindering means assembled, as in Figure 26, is then inserted in the brush-holder box. The member that limits the advancement of the pressure finger is then attached by the pigtail retaining screw 148, and the knurled nut 153 adjusted to a position depending on the depth of the flat spot in the commutator. It is generally advisable to set the knurled nut at a position higher than seems necessary to eradicate completely the flat spot in the commutator. On a second inspection a more accurate adjustment of the knurled nut can be made.

If an untempered abrasive is being used—that is, one without any mixture of carbon—it is advisable to blow out the armature every day or two with compressed air in order to prevent the possibility of the armature being burned out from the accumulation of copper dust in the commutator risers. Where there is a large amount of carbon in the abrasive member, say 75% carbon and 25% abrasive—this precaution is hardly necessary.

In many cases the simpler subcombination shown in Figure 27 will give perfectly satisfactory results. In this case the abrasive member may have 75% of carbon and 25% of abrasive powder, the abrasive powder being preferably of a mesh not coarser than 200 to the inch. The limiting device need not be used with an abrasive of this type, and the protective member 144 may also be omitted. The old brush is removed and the abrasive member substituted for it. The stiffer the actuating spring of the pressure finger is set the quicker the commutator will be trued up. Even though the actuating spring is made as stiff as possible the truing up of the commutator will be much slower than where a pure abrasive is used. After the commutator has become true there is theoretically no retrograde movement to the abrasive member; consequently the thrust of the abrasive member against the commutator will always be hindered by friction; consequently there will not be much wear on the commutator when it becomes true. Consequently, if the abrasive members have been substituted for only a few brushes on the machine, they may be left on and the pressure finger spring made as weak as possible or thrown off entirely. At the slightest sign of a flat spot on the commutator tension can be put on the actuating spring, or increased if already on. This plan of keeping a few abrasive members floating lightly on the commutator gives a very simple method of keeping a commutator in good condition.

The fact that the viscosity of asphalt varies with the temperature gives another means of controlling the movement of the abrasive member. This is conveniently done by controlling the heat received from an electric lamp 157, either by the distance of the lamp from the brush holder, or by the variable interposition of a screen, as by the rotation of the shade 158, or by current control, as by the rheostat 159. With the harder kind of asphalts—those that do not flow at all at brush-holder temperatures—the movement of the abrasive member may be stopped or started or otherwise controlled merely by varying the amount of heat received by the asphalt.

Since the brush holders generally get hotter when commutating conditions are bad, it is possible to select the grade of asphalt that will not flow when the commutator is in good shape, but that will flow and permit remedial action by the abrasive member whenever commutator conditions become bad. In this way the commutator will practically automatically keep itself in a certain condition of operation. If the electric machine is of the enclosed type, a variable opening may be given to the enclosing doors to modify the viscosity of the asphalt. That is, with the doors entirely closed bad commutator conditions would start remedial action sooner than if the doors were open. Consequently it is easily within the bounds of possibility that we could true up a commutator simply by closing the doors on an enclosed electric machine; or by allowing a little more heat from an electric lamp to reach a brush holder.

In the modification shown in Figure 31 another way is indicated to get a wedging effect between the abrasive 165 and the brush 166. The abrasive and brush may be reversed if desired, the abrasive taking the form of 166 and the brush the form of 165.

In the modification shown in Figures 32 and 33 the brush holder pressure finger is divided into two parts, a main part 171 and a terminal 172 part, the terminal part, by means of the screws 173, being slidably mounted on the main part. To the outer end of the terminal part is attached the cylindrical brush-engaging tip 174, the said brush-engaging tip frictionally engaging the side 175 of the brush-holder box as well as the wedge end of the abrasive brush or abrasive block 176. It is evident that considerable more pressure will be necessary by the high spot on the commutator to shove the brush backwards than will be needed by the low spot of the commutator to stop the forward motion of the brush. Consequently the commutator will finally become true.

When it is desired to use the usual brush in this brush-holder the screws 173 may be tightened up.

In the modification shown in Figures 34, 35 and 36 the terminal part 181 of a divided pressure finger is slidably mounted on the main part 182. To the end of the terminal part is secured the stirrup 183 within which is pivotally mounted by means of the pin 184 the wedging block 185 which frictionally engages the side 186 of the brush-holder box and the wedge end 187 of the brush or abrasive block 188. In Figure 36 the wedging block 185 has been rotated 180° from the position shown in Figure 34 in order to non-wedgingly engage the usual square end brush 189.

The modification shown in Figures 37 and 38 differs from that shown in Figures 34, 35 and 36 in using a pair of wedging blocks instead of only one. The two wedging friction blocks 191 and 192 are loosely assembled by means of the flat headed pins 193, which are driven tightly into the wedging block 191, but have considerable body clearance and head clearance in the wedging block 192. A square headed brush or abrasive block 194 may be used in this modification, as all the friction comes between the wedging blocks and the sides of the brush-holder box, and none on the brush. In Figure 38 the wedging blocks 191 and 192 have been rotated 180°, so that friction in the wedging blocks is avoided.

In Figure 39 is shown a brush holder with a type of finger in common use. The wedging blocks 201 and 202 are the same as those used in Figures 37 and 38, except that they are secured to the pressure finger 203 by a link 204 engaging the partially closed bight 205 in the end of the pressure finger. The wedging members may be unsnapped from the bight to permit the use of the brush holder in the usual way.

In the modification shown in Figure 40 only one wedging block 211 is used, said wedging block 211 being secured by the link 212 to the bight 213 in the end of the pressure finger 214. A wedge end brush or abrasive block 215 is used in this modification. The wedging block 211 may be unsnapped from the partially closed bight 213 in the end of the pressure finger 114 when it is desired to use the usual brush.

As indicated by the broken line 216 the upper side of wedging block 211 may be of wedge shape in order to give additional friction for truing purposes.

In Figure 41 is shown a pusher member 231 with teeth 232 in one edge to engage one side of the brush-holder box 233 and prevent a retrograde movement of the brush or abrasive 234. The pusher member is of metal and the teeth are hardened. In Figure 42 a series or set of hardened metal teeth 235 is inserted in the fibre pusher member 236. Figure 43 shows how the same idea is carried out by the use of an abrasive pusher member 237 instead of one with teeth. The pusher member should preferably be of coarse grain and hard grade. The surface 238 of the other member (brush or abrasive) 239 that engage the walls of the brush-holder box may be coated with graphite to diminish the friction and prevent the possibility of a locking of the pusher member and active member when going forward. Figure 44 shows a self-contained pusher member, that is, one acting without the frictional help of the active member 240. The outer half 241 of the pusher member has a friction surface 242 (such as leather) on the side that engages the wall of the brush-holder box. The other half 243 of the pusher member has its side 244 that engages the wall of the brush-holder box lubricated with graphite or oil. By properly selecting the angle of the pusher member with reference to the coefficient of friction (which is the tangent of the angle of repose) we can have a wedge angle less than the angle of repose for the upper half of the pusher member and greater than the angle of repose for the lower half, so that there will be no locking on a forward movement but locking on a backward movement. In this way I get a positive feed brush holder.

Figure 45 shows an abrasive member with its wedge end having a roof-shaped form 248, the wedge end of the pusher member having a complementary trough-shaped form 249 to fit over the roof-shaped form of the abrasive member, by this means the pusher member tends to support the abrasive member and preserve its vertical alignment with the axis of the brush holder box when the abrasive member has been worn comparatively short.

The roof-shaped form might be in the pusher member and the trough-shaped form in the abrasive member if desired.

In the modification shown in Figure 46 means is provided for limiting the advancement of the abrasive brush or abrasive member to a predetermined amount. Mounted in the brush-holder box 251 is the abrasive brush or abrasive member 252 with a wedge-shaped outer end coacting with a similar wedge-shaped end of the pusher member 253 which receives the thrust of the brush-holder pressure finger 254 to advance the brush or abrasive member to contact with the commutator 255.

Attached to the upper part of the abrasive member 252 by the rivet 256 is the thin metal strip 257 having a slot 258 in which is mounted the small screw 259 adjustable by the nut 261 to any position in said slot. A short portion of the end of the strip is bent over at right angles at 262.

In the operation of this modification the screw 259 is adjusted to allow the abrasive member to advance far enough to grind out the flat spots of the commutator, erring preferably on the side of too little advancement rather than too much; a second setting of the screw can then be made so as to finish grinding out the flat spot without any unnecessary wear of the commutator or of the abrasive member. The screw, when it strikes the top of the brush-holder box, stops the further advance of the abrasive member; if the screw is lost the right angle end 262 striking the top of the brush-holder box, definitely stops the advancement of the abrasive before it has become so short as to be tilted or canted out of alignment with the axis of the brush-holder box, with the consequent possibility of making the flat spots worse instead of better.

In the modification shown in Figures 47, 48 and 49 a hollow wedge 275 actuated by the spring 276 put under stress by the screw 277 slides in the trough of the channel-shaped brush-holder finger 278 and exerts an upward thrust against the bottom rounded shoe 279, said shoe being adjustable by the screw 280 for vertical position in the guide 281 secured by its foot 282 to the brush-holder frame by the retaining strap 283 held by the screw 284 which screw also secures the terminal 285 of the brush pigtail 286. The contact surfaces of the wedge and shoe are covered with strips of leather 287 and 288. Where the contact surfaces of the wedge and shoe are metal the angle of the wedge should preferably be not more than about 15° when it is desired to prevent all retrograde movement of the brush. Where friction surfaces are used on either the wedge or shoe on both or where the wedge or shoe is made of wood or fibre, a wedge with a considerably greater angle than 15° can be used. In fact a wedge with an angle nearly as large as the angle whose tangent is the coefficient of friction can be used.

The spring 276 has the fixed end 289 hooked over the rear end of the channel-shaped brush-holder finger 278, the movable end 290 of said spring 276 being secured to the square nut 291 traveling on the long screw 277.

In the use of the brush-holder modification shown in Figures 47, 48 and 49 pressure is put on the pressure finger by the adjustment of the arms 249c and 250c of the actuating spring 210c in the usual way as explained above. Stress is then put on the spring 276 by turning the screw 277 in a direction to move the traveling nut 291 to the left. The screw 277 is rotated by the slotted heads 292 and 293. The spring 276 draws the wedge 275 to the right till it is stopped by butting into the shoe 279. In this position the wedge as shown is able to retain all the advancement made by the pressure finger 278. As the brush slowly wears away the wedge moves slowly to the right, always being in a position to hold all advancement made by the pressure finger. By making the angle between the inclined face and bottom of the wedge sufficiently great, hindered retrograde movement of the brush may be had.

However, it is possible to leave the spring 210c out of action altogether, using only the spring 276 both to advance the pressure finger and to hold all advancement made.

In the modification shown in Figures 50, 51 and 52 a pair of open-sided tubes or grooves 341, 341 are formed in the brush-holder body in the rear of the brush-holder box 342 and adjacent thereto, and separated therefrom by the common wall 343, the other wall being 344. Slidably mounted in the grooves 341, 341 is a plurality of wedging members 346 in complementary engagement with each other and in engagement with the walls 343 and 344 of the grooves 341. These wedging members 346 are serially related, and are kept in loose assemblage by the rods 347 which pass through the holes 348 in the wedging members 346. The rods 347 have washers 349 at the ends to retain the wedging members 346. Encircling the rods 347 immediately above the series of wedging members 346 are the spiral springs 350. Positioned immediately above the springs 350 and encircling the square rods 347 are the nuts 351 with square holes slidably fitting the square rods 347. The square rods 347 are preferably turned down at the end to a cylindrical form, leaving only the intermediate parts that slidably coact with the nuts 351 in square form. The nuts 351 are threaded into the walls of the grooves 341, 341.

Threaded to the upper ends of the rods 347 and additionally secured by the cotter pins 352 are the caps 353 slotted at 354 for a screw-driver, and bearing on either end of the cross bar 355, the middle part of which in turn bears on the brush-holder finger 356. To facilitate removal of the cross bar 355 from the rods 347 the holes in said cross bar may be slotted, one hole being slotted on one side of the cross bar and the other hole on the other side of the cross bar. At the bottom of the grooves 341 are the limit pins 357. The pressure finger is actuated by the usual spring 358.

In the operation of this brush holder it is evident that if a screw-driver is applied to the notches 354 and the square rods 347 rotated to the right the nuts 351 will be advanced and the springs 350 compressed and the frictional resistance of the wedges 346 to a reactional pressure finger thrust proportionally increased. It is evident also that there will be no hindrance whatever to a forward motion of the pressure finger 356, the usual spring 358 being used in the usual way to advance the said pressure finger 356. On the other hand the springs 350 will help the spring 358 to advance the pressure finger 356. If desired the spring 358 may be left out of action altogether and the pressure finger 356 advanced by the springs 350 only.

There are two 45° inclinations in the four wedging members 346. With a coefficient of friction between the wedging members 346 and the walls of the grooves 241 assumed to be 1/3, 4 pounds pressure exerted by the spring 350 will result in 1 pound pressure on the pressure finger 256. In order for the pressure finger 356 to move backwards and overcome 4 pounds exerted by the springs 350, the pressure finger will have to exert a backward thrust of about 16 pounds, giving a pressure ratio of 16. The addition of two more wedging members (one inclination) will make necessary a backward thrust of 32 to overcome 4 pounds exerted by the springs 350. A pressure of 4 pounds at the springs can be stopped by 1/2 pound at the brush giving a pressure ratio of 64. It is evident that this resistance to a backward thrust of the pressure finger can be made as great as desired by adding more wedging members 346, thus giving what is practically a positive advancement to the pressure finger.

While the use of 4 or 6 wedging members results in what is practically positive advancement to the pressure finger, yet theoretically the result is only a frictionally hindered pressure finger, and may also come under another specification claiming a brush holder with a friction finger.

It is obvious that stop shown in Figure 46 may be employed in any of the specific forms of the invention shown in the remaining figures.

When my improved brush holder is used with an abrasive brush for truing commutators the brush employed should contain enough abrasive to produce a truing effect sufficient to more than offset the tendency of sparking between the brush and commutator to cause the commutator to become out of round. The abrasive content may range from 10% to 70% although in certain cases I may employ less than 10%. I find that a brush containing 25% abrasive and 75% carbon or similar conducting material produces very satisfactory results.

By abrasive I mean a material which has a substantial abrasive action on the commutator bars, such for example as carborundum, corundum or emery, as disclosed specifically in my co-pending application Serial Number 278,749.

Other forms of the generic invention herein disclosed are described in my co-pending applications Serial Numbers 278,748, 278,749, 278,750, 278,752, 381,176, and my Patent #1,727,112, dated September 3, 1929. My said applications Serial Numbers 278,749 and 278,750 contain broad claims to the idea of resisting movement of the brush, particularly for the purpose of truing the commutator.

I claim:

1. In a device for truing commutators, a brush holder having a brush guiding box, an abrasive member mounted in said box and adapted to be forwardly advanced therethrough, means for pressing the abrasive member against said box and protecting means interposed between said member and box.

2. The combination with a supporting means of a brush holder carried thereby and having a rigidly supported brush guide with guiding sides, a brush having an abrasive action substantially greater than a brush consisting of 95% brush carbon and 5% carborundum slidable along said guide, means for automatically advancing the brush along the guide and a wedge-shaped follower interposed between the said means and brush adapted to be forced by said means and brush into frictional engagement with a said side.

3. In a dynamo electric machine having a brush holder comprising a brush guide formed with guiding sides and a support for said guide offering substantial resistance to any slight retrograde movement of said guide, a member having an abrasive action substantially greater than a brush consisting of 95% brush carbon and 5% carborundum, movable along said guide, means for resisting all retrograde movement of said member along said guide, said means comprising a second member movable with said first member along said guide and movable to a slight extent laterally of said first member into frictional engagement with one of said guiding sides, and means for advancing said first and second members along said guide, with said second member pressed into said frictional engagement.

4. In a dynamo electric machine having a brush holder comprising a rigid shank, a brush box carried by said shank, formed with guiding side walls, a pressure finger, a brush having abrasive action substantially greater than a brush consisting of 95% brush carbon and 5% carborundum, in said box, a member in said box between said brush and finger and slightly movable, laterally of said brush, into frictional engagement with one of said walls of said box, and means for advancing said finger, member and brush and pressing said member into said frictional engagement.

5. The combination with a supporting means of a brush holder carried thereby and having a rigidly supported brush guide with guiding sides, a brush having an abrasive action substantially greater than a brush consisting of 95% brush carbon and 5% carborundum, slidable along said guide, means for automatically advancing the brush along the guide, and complementary wedge-shaped followers interposed between the said means and brush adapted to be forced by said means and brush into frictional engagement with said sides.

6. A block having an abrasive action substantially in excess of a consolidated mixture of 95% brush carbon and 5% carborundum, said block being wearable in use in the direction of its axis, and a follower member, means tying said follower to one end of said block and permitting lateral movement of one with respect to the other, the points of engagement of said block and said follower member lying in a plane or planes substantially out of normalcy with the axis of said block whereby pressure of said follower against said block causes a lateral thrust of said follower and block.

7. The combination with a supporting means, a brush holder carried by said means and having a rigidly supported brush guide with guiding sides, a brush slidable along said guide, said brush having an abrasive action substantially greater than a consolidated mixture of 95% brush carbon and 5% carborundum, a pressure finger for automatically advancing said brush along said guide and a follower friction member interposed between said brush and finger and having contact surfaces adapted to engage corresponding surfaces of said brush and pressure finger, one of said surfaces and its corresponding contacting surface being such that a common tangential plane thereto is substantially out of normalcy to the axis of the brush.

8. The combination with a supporting means of a brush holder carried thereby and having a rigidly supported brush guide with guiding sides, a brush having an abrasive action substantially greater than a brush consisting of 95% brush carbon and 5% carborundum, slidable along said guide, means for automatically advancing the brush along the guide, a wedge-shaped follower interposed between the said means and brush adapted to be forced by said means and brush into frictional engagement with a said side, and delayed action hindering means for retarding the advance of said brush.

9. The combination with a supporting means of a brush holder carried thereby and having a rigidly supported brush guide with guiding sides, a brush having an abrasive action substantially greater than a brush consisting of 95% brush carbon and 5% carborundum, slidable along said guide, means for automatically advancing the brush along the guide, a wedge-shaped follower interposed between the said means and brush, adapted to be forced by said means and brush into frictional engagement with a said side, and means comprising slowly deformable material connecting said brush and brush holder.

10. The combination with a supporting means of a brush holder carried thereby and having a rigidly supported brush guide with guiding sides, a brush having an abrasive action substantially greater than a brush consisting of 95% brush carbon and 5% carborundum, slidable along said guide, means for automatically advancing the brush along the guide, a wedge-shaped follower interposed between the said means and brush adapted to be forced by said means and brush into frictional engagement with a said side, and asphalt hindering means connecting said brush and guide.

11. In a dynamo electric machine having a brush holder comprising a brush guide formed with guiding sides and a support for said guide offering substantial resistance to any slight retrograde movement of said guide, a member having an abrasive action substantially greater than a brush consisting of 95% brush carbon and 5% carborundum, movable along said guide, means for resisting all retrograde movement of said member along said guide, said means comprising a second member movable with said first member along said guide and movable to a slight extent laterally of said first member into frictional engagement with one of said guiding sides, means for advancing said first and second members along said guide, with said second member pressed into said frictional engagement, and delayed action hindering means for retarding advance of said first member.

12. In a dynamo electric machine having a brush holder comprising a brush guide formed with guiding sides and a support for said guide offering substantial resistance to any slight retrograde movement of said guide, a member having an abrasive action substantially greater than a brush consisting of 95% brush carbon and 5% carborundum movable along said guide, means for resisting all retrograde movement of said member along said guide, said means comprising a second member movable with said first member along said guide and movable to a slight extent laterally of said first member into frictional engagement with one of said guiding sides, means for advancing said first and second members along said guide with said second member pressed into said frictional engagement, and viscous material connecting said first member and guide.

13. In a dynamo electric machine having a brush holder comprising a rigid shank, a brush box carried by said shank, formed with guiding side walls, a pressure finger, a brush having abrasive action substantially greater than a brush consisting of 95% brush carbon and 5% carborundum, in said box, a member in said box between said brush and finger and slightly movable, laterally of said brush, into frictional engagement with one of said walls of said box, means for advancing said finger, member and brush and pressing said member into said frictional engagement, and delayed action hindering means for retarding advancement of said brush.

14. For dynamo electric machines a rubbing member, comprising an active part of integral construction having in its composition more than 10% of an abrasive of substantially the abrasiveness of emery, the remaining percentage of said active part being made up of substantially abrasively inert material, the axis of said active part being in the direction of wear in use of said active part, and associated with said active part a follower part, and means connecting said follower to said active part and permitting slight movement of said follower in a direction at right angles to the axis of said active part.

15. In a dynamo electric machine having a brush holder comprising a brush guide formed with guiding sides and a support for said guide offering substantial resistance to any slight retrograde movement of said guide, a member having an abrasive action substantially greater than a brush consisting of 95% brush carbon and 5% carborundum, movable along said guide, means for resisting all retrograde movement of said member along said guide, said means comprising a second member movable with said first member along said guide and movable to a slight extent laterally of said first member into frictional engagement with one of said guiding sides, means for automatically advancing said first and second members along said guide with said second member pressed into said frictional engagement, delayed action hindering means for retarding advancement of said first member and means for controlling the retarding effect of said last named means.

Signed at New York, in the county of New York and State of New York, this 17th day of May, A. D. 1928.

HORACE D. MUNDAY.